United States Patent
Nakagawa et al.

(10) Patent No.: US 6,713,771 B2
(45) Date of Patent: Mar. 30, 2004

(54) METHOD AND APPARATUS FOR ELECTROMAGNETIC IRRADIATION OF LIQUID

(75) Inventors: Sota Nakagawa, Tokyo (JP); Toshihiro Tanaka, Tokyo (JP); Yasushi Kosaka, Tokyo (JP); Mitsuru Imai, Tokyo (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 10/204,599

(22) PCT Filed: Feb. 26, 2001

(86) PCT No.: PCT/JP01/01401
§ 371 (c)(1),
(2), (4) Date: Nov. 26, 2002

(87) PCT Pub. No.: WO01/62671
PCT Pub. Date: Aug. 30, 2001

(65) Prior Publication Data
US 2003/0141457 A1 Jul. 31, 2003

(30) Foreign Application Priority Data
Feb. 25, 2000 (JP) ......................................... 2000-049657

(51) Int. Cl.⁷ ................................................. H01J 37/06
(52) U.S. Cl. .................. 250/436; 250/431; 250/432 R; 250/438; 250/435; 250/434
(58) Field of Search ................................. 210/105, 748; 422/186.3, 186, 24, 905; 204/157.15, 157.1 R (56) References Cited

U.S. PATENT DOCUMENTS

| | | | |
|---|---|---|---|
| 3,659,096 A | * 4/1972 | Kompanek | .................. 250/434 |
| 3,891,855 A | 6/1975 | Offermann | |
| 4,274,970 A | * 6/1981 | Beitzel | ........................ 210/748 |
| 5,072,124 A | 12/1991 | Kondo et al. | |
| 5,503,800 A | * 4/1996 | Free | ............................ 250/436 |
| 5,725,757 A | * 3/1998 | Binot | .......................... 250/431 |
| 6,570,167 B1 | * 5/2003 | Bryer et al. | ................ 250/431 |

FOREIGN PATENT DOCUMENTS

| | | |
|---|---|---|
| JP | 51-59449 | 11/1974 |
| JP | 3-109986 | 5/1991 |

* cited by examiner

*Primary Examiner*—John Lee
*Assistant Examiner*—James P. Hughes
(74) *Attorney, Agent, or Firm*—Wenderoth, Lind & Ponack, L.L.P.

(57) ABSTRACT

An electromagnetic wave applying apparatus having an electromagnetic wave source (13) such as an ultraviolet lamp or the like, a cylinder (15) surrounding the electromagnetic wave source, a liquid retention tank (16) disposed around the cylinder, and an inlet portion (17) for introducing a liquid overflow from the liquid retention tank as a thin film flowing down an inner wall surface of the cylinder, which is irradiated with an electromagnetic wave from the ultraviolet lamp (11). The electromagnetic wave applying apparatus also has swirling flow forming means for causing the liquid introduced from the inlet portion (17) onto the inner wall surface of the cylinder to flow as a swirling flow down the inner wall surface. The electromagnetic wave applying apparatus allows a large amount of liquid to be stably treated by the application of an electromagnetic wave without causing the electromagnetic wave source such as an ultraviolet lamp or the like to be contaminated.

17 Claims, 6 Drawing Sheets

METHOD AND APPARATUS FOR ELECTROMAGNETIC IRRADIATION OF LIQUID

BACKGROUND OF THE INVENTION

1. Field of the Invention

The present invention relates to an apparatus for and a method of applying an electromagnetic wave to a liquid, and more particularly to an apparatus for and a method of applying an electromagnetic wave such as ultraviolet rays or the like to various liquids including water being processed in wastewater treatment plants, industrial drains, water for various uses, sewage, purified water, drinking water, pure water, ultrapure water, etc.

2. Description of Related Art

The application of electromagnetic waves such as ultraviolet rays or the like to liquids is widely used for the purposes of treating or sterilizing trace amounts of contaminants by way of excitation and/or dissociation of molecular bonds of organic substances or oxidizing agents. According to such a process, ultraviolet rays and an oxidizing agent such as ozone are used together to generate OH radicals, which decompose underwater contaminants by way of oxidization. The process does not produce secondary waste materials and is capable of decomposing dioxins and so on in water.

It is customary to apply ultraviolet rays to a liquid to be treated from an ultraviolet lamp which is sealed in a water-tight fashion by a transparent protective tube of quartz and immersed in a tank that contains the liquid to be treated. When the protective tube sealing the ultraviolet lamp is immersed in the liquid to be treated, inorganic substances such as metals (iron, manganese, etc.) in the liquid or organic substances in the liquid are attached to the outer circumferential surface of the transparent protective tube, depositing a covering thereon which tends to lower the radiated intensity of the ultraviolet rays.

There is known another method of treating a liquid by letting the liquid flow in the form of a thin film down a vertical wall surface and irradiating the liquid with an electromagnetic wave such as ultraviolet rays or the like emitted from a position spaced from the liquid. Since the source of the electromagnetic wave such as ultraviolet rays or the like is positioned remotely from the liquid, the method is effective to prevent the problem that contaminants are attached to a protective tube or the like of an electromagnetic wave source, lowering the radiated intensity. However, the distance between the electromagnetic wave source and the liquid to be treated poses a problem. Specifically, if the distance between the electromagnetic wave source and the liquid to be treated is large, then the radiated intensity of the electromagnetic wave is reduced. If the distance between the electromagnetic wave source and the liquid to be treated is reduced and the electromagnetic wave source and the liquid to be treated are positioned closely to each other, then the radiated intensity of the electromagnetic wave can be achieved, but it is difficult to form a stable, high-speed thin film of liquid flowing down a vertical wall surface. In case the amount of the liquid to be treated is small, a thin film of liquid can be formed which can sufficiently be irradiated with an electromagnetic wave. In case the amount of the liquid to be treated is large, however, the thickness of the film of liquid flowing down is increased, and when the speed of the flowing liquid is increased, the thin film of liquid becomes unstable, producing splashes which are scattered and contaminate the electromagnetic wave source.

SUMMARY OF THE INVENTION

The present invention has been made in view of the above drawbacks. It is an object of the present invention to provide an apparatus for and a method of applying an electromagnetic wave to treat a large amount of liquid stably without causing an electromagnetic wave source to be contaminated.

According to the present invention, an electromagnetic wave applying apparatus comprises an electromagnetic wave source, a cylinder surrounding the electromagnetic wave source, a liquid retention tank disposed around the cylinder, and an inlet portion for introducing a liquid overflow from the liquid retention tank as a thin film flowing down an inner wall surface of the cylinder, which is irradiated with an electromagnetic wave from the electromagnetic wave source, wherein the inlet portion has a curved surface joining an overflow portion of the liquid retention tank to the inner wall surface of the cylinder.

Since the overflow portion of the liquid retention tank and the inner wall surface of the cylinder are connected to each other by the curved surface of the inlet portion, a thin-film liquid layer can be formed stably on the inner wall surface of the cylinder even if the liquid flows in a large quantity. Consequently, the electromagnetic wave applying apparatus can increase the amount of the liquid treated thereby without contaminating the electromagnetic wave source.

The electromagnetic wave applying apparatus preferably includes swirling flow forming means for causing the liquid introduced from the inlet portion onto the inner wall surface of the cylinder to flow as a swirling flow down the inner wall surface.

According to another aspect of the present invention, an electromagnetic wave applying apparatus comprises an electromagnetic wave source, a cylinder surrounding the electromagnetic wave source, a liquid retention tank disposed around the cylinder, an inlet portion for introducing a liquid overflow from the liquid retention tank as a thin film flowing down an inner wall surface of the cylinder, which is irradiated with an electromagnetic wave from the electromagnetic wave source, and swirling flow forming means for causing the liquid introduced from the inlet portion onto the inner wall surface of the cylinder to flow as a swirling flow down the inner wall surface.

Even when the liquid splashes, since the direction of the liquid splashes is tangential to the inner wall surface of the cylinder, the protective tube disposed at the center of the cylinder is prevented from being contaminated by liquid splashes. The liquid flowing down the inner wall surface of the cylinder is subject to centrifugal forces, producing the thin film of the liquid uniformly and stably.

The inner wall surface of the cylinder is preferably slanted such that the diameter thereof is greater upwardly and smaller downwardly. With the slanted inner wall surface, the liquid is not peeled off the inner wall surface of the cylinder, and flows smoothly down the inner wall surface.

Preferably, the electromagnetic wave comprises ultraviolet rays and the electromagnetic wave source comprises an ultraviolet lamp.

According to the present invention, a method of applying an electromagnetic wave to a liquid comprises; introducing a liquid along a curved surface to an inner wall surface of a cylinder from an upper end thereof, flowing the liquid to flow as a thin film down the inner wall surface of the cylinder; and applying an electromagnetic wave from an electromagnetic wave source disposed substantially centrally in the cylinder to the liquid.

The electromagnetic wave is preferably applied to the liquid while the liquid is flowing as a swirling thin film down the inner wall surface of the cylinder from the upper end thereof.

According to another aspect of the present invention, a method of applying an electromagnetic wave to a liquid comprises; flowing a liquid to flow as a swirling thin film down an inner wall surface of a cylinder from the upper end thereof; and applying an electromagnetic wave to the liquid from an electromagnetic wave source disposed substantially centrally in the cylinder.

DETAILED DESCRIPTION OF THE INVENTION

Figure 1:
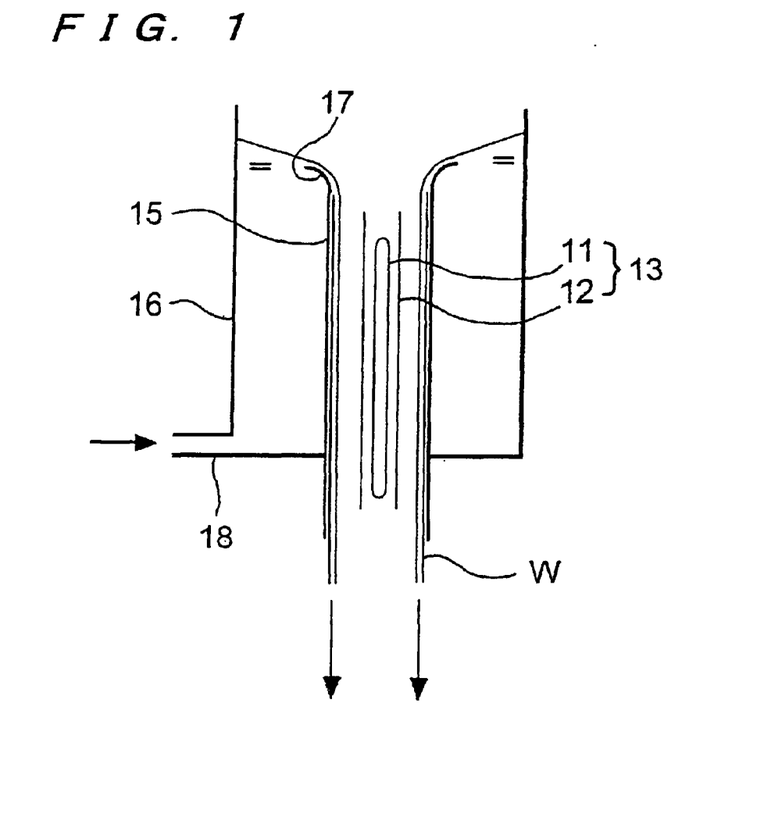
FIG. 1 is a vertical cross-sectional view of an apparatus for applying ultraviolet rays to a liquid according to an embodiment of the present invention.
Figure 2:
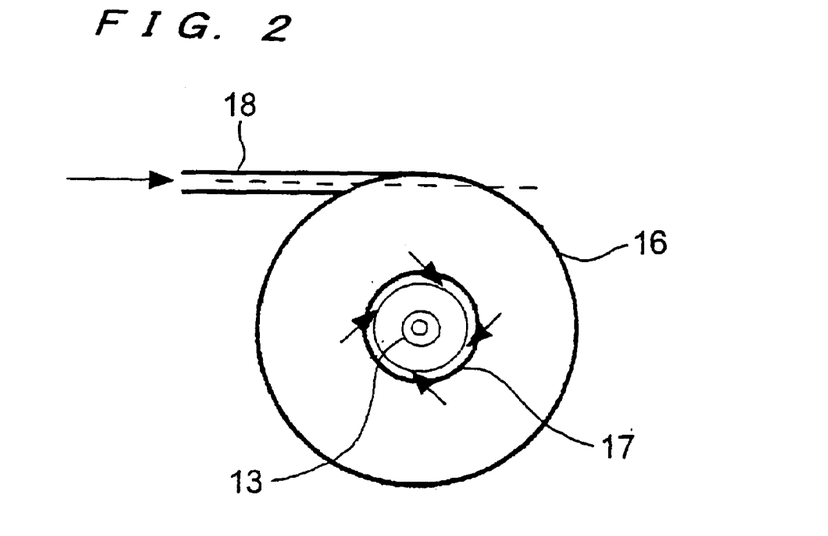
FIG. 2 is a plan view of the ultraviolet applying apparatus shown in FIG. 1.

FIG. 1 shows a cross-sectional structure of an electromagnetic wave applying apparatus according to an embodiment of the present invention, and FIG. 2 shows a plan structure of the electromagnetic wave applying apparatus. The electromagnetic wave applying apparatus according to the embodiment of the present invention has an ultraviolet lamp 11 disposed centrally therein for applying ultraviolet rays which are a type of electromagnetic wave and a protective tube 12 of transparent quartz glass or the like surrounding the ultraviolet lamp 11 for protecting the ultraviolet lamp 11 against direct contact with splashes. The ultraviolet lamp 11 and the protective tube 12 jointly make up an electromagnetic wave source 13, around which a cylinder 15 is coaxially disposed. The electromagnetic wave source 13 applies ultraviolet rays to a thin-film liquid layer W flowing down the inner wall surface of the cylinder 15. A liquid retention tank 16 is disposed around the cylinder 15 and stores a liquid which overflows the upper end of the liquid retention tank 16 and flows down the inner wall surface of the cylinder 15. If a plurality of cylinders is employed, then they may share the liquid retention tank disposed therearound.

The upper end of the liquid retention tank 16 has an inlet portion 17 for introducing the liquid overflow as a thin film flowing down the inner wall surface of the cylinder 15 which is irradiated by the electromagnetic wave source 13. The inlet portion 17 is defined by a bell-mouthed surface which is curved so as to be smoothly joined to the inner wall surface of the cylinder 15. The electromagnetic wave applying apparatus also has a swirling flow forming means for causing the liquid to flow as a swirling flow down the inner wall surface of the cylinder 15. Specifically, the liquid retention tank 16 has an inflow tube 18 fixedly connected to the bottom thereof for introducing the liquid into the liquid retention tank 16 tangentially to the outer circumferential surface of the liquid retention tank 16, as shown in FIG. 2. Therefore, the introduced liquid is delivered upwardly while swirling around along the inner surface of the outer circumferential wall of the liquid retention tank 16, flows down the curved surface of the inlet portion 17 from the upper overflow end of the liquid retention tank 16, and then flows as a swirling flow down the inner wall surface of the cylinder 15. On the inner wall surface of the cylinder 15 which is irradiated by the electromagnetic wave source 13, therefore, the liquid W is irradiated with ultraviolet rays while swirling around and flowing down as a thin film. In the example shown in FIG. 2, the inflow tube is connected tangentially to the outer circumferential surface of the liquid retention tank 16. However, the inflow tube may be connected at any angle capable of forming a swirling flow in the liquid retention tank 16, rather than tangentially to the outer circumferential surface of the liquid retention tank 16.

Figure 3A:
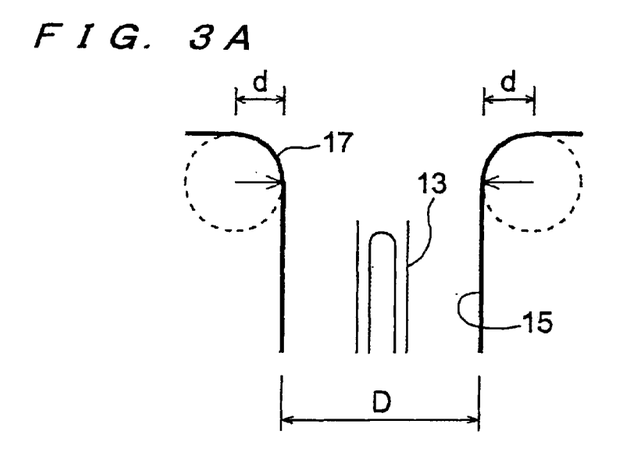
FIGS. 3A through 3C are views showing various shapes of an inlet portion on an upper portion of the inner wall surface of a cylinder.
Figure 3B:
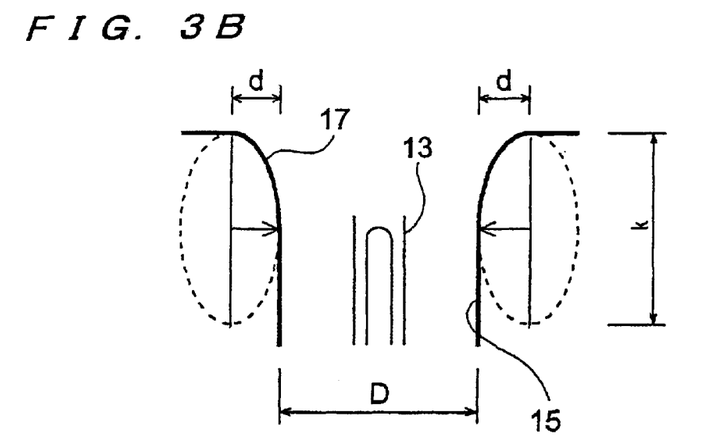
Figure 3C:
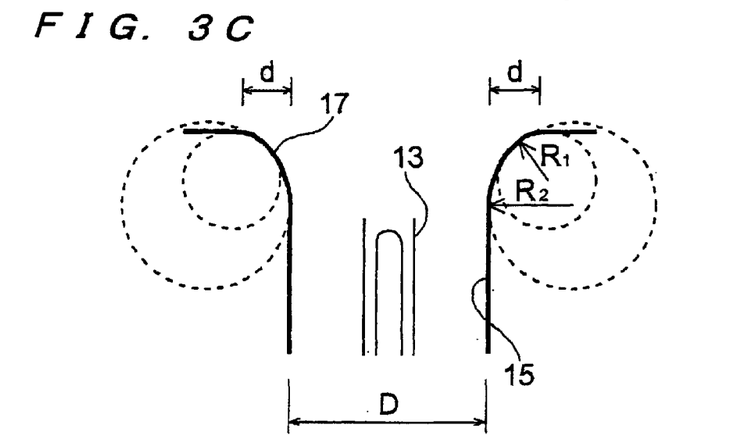

FIGS. 3A through 3C show the various shapes of the inlet portion. The bell-mouthed surface signifies an opening surface of a bell (a curved inner circumferential surface). The smoothly curved surface joins the inlet portion from the overflow end of the liquid retention tank 16 to the inner wall surface of the cylinder 15 which is substantially vertical. FIG. 3A shows a curved surface defined by an arc which is one-quarter of a true circle having a diameter of d. FIG. 3B shows a curved surface defined by an arc which is one-quarter of an oblong circle. FIG. 3C shows a smooth profile defined by a combination of an arc having a radius of $R_1$ and an arc having a radius of $R_2$. In each of these configurations, the ratio (d/D) of the radius d of the bell-mouthed arc to the diameter D of the inner wall surface of the cylinder 15 should preferably be 0.1 or higher. The arc should preferably be an arc in the range from 3/16 to 8/16.

The electromagnetic wave applying apparatus operates as follows: Ultraviolet rays which is a type of electromagnetic wave are applied from the ultraviolet lamp 11 disposed in the protective tube 12 to a thin film of the liquid W flowing down the inner wall surface of the cylinder 15. When the liquid layer flows over the upper overflow end of the inner wall surface of the cylinder 15 and down as a thin film along the inner wall surface of the cylinder 15, it is introduced through the inlet portion 17 in the form of a curved surface onto the inner wall surface of the cylinder 15. Therefore, the overflow from the liquid retention tank 16 is smoothly introduced as a thin film onto the inner wall surface of the cylinder 15, and smoothly flows down the inner wall surface of the cylinder 15. Therefore, there is produced a downwardly flowing liquid layer of uniform thickness without producing splashes and thickness irregularities. As the liquid swirls in the liquid retention tank 16 and forms a downwardly flowing layer from the inlet portion along the inner wall surface of the cylinder 15, the liquid is subject to centrifugal forces and has its surface stabilized and/or uniformized, so that the liquid overflow is supplied from all locations on the inlet portion at a constant rate to the inner wall surface of the cylinder 15 which is irradiated with ultraviolet rays. Since the liquid is given a swirling flow speed, even if the liquid contains suspended materials, they are prevented from being settled and/or accumulated in the liquid retention tank 16. Even when the liquid splashes, the liquid is scattered tangentially to the inner wall surface of the cylinder, rather than centrally toward the protective tube 12. Consequently, the liquid splashes are prevented from being applied to the protective tube 12, which is thus prevented from being contaminated. Furthermore, the thickness of the liquid layer is uniformized as the liquid is subject to centrifugal forces because of the swirling flow thereof. Due to the centrifugal forces acting on the liquid, the thin-film liquid on the inner wall surface of the cylinder 15 is retained thereon for a period of time longer than if there were no swirling flow thereon.

Figure 4:
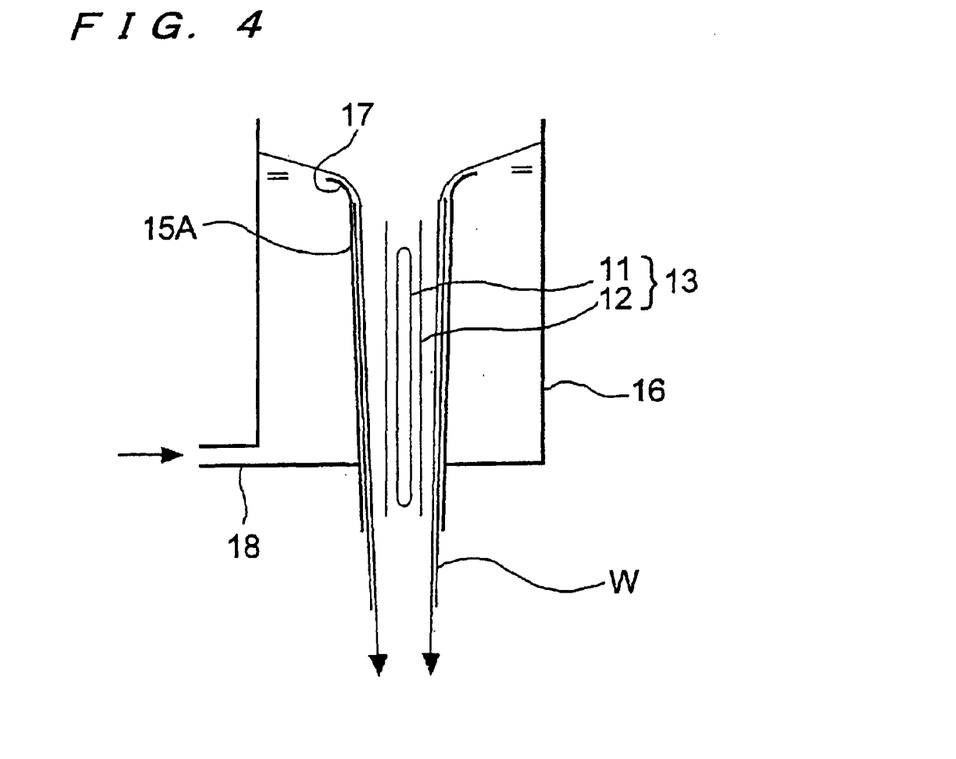
FIG. 4 is a view of a modification of the ultraviolet applying apparatus shown in FIG. 1, showing the slanted inner wall surface of a cylinder.

As shown in FIG. 4, the inner wall surface of a cylinder 15A which is irradiated with ultraviolet rays may be progressively smaller in diameter from the upper portion to the lower portion thereof. According to this modification, the liquid layer produced by the liquid that flows in from the inlet portion is prevented from being peeled off the inner wall surface of the cylinder 15A which is irradiated with ultraviolet rays. Therefore, even when the liquid is supplied in a large quantity, a thin-film liquid layer can stably be formed on the inner wall surface of the cylinder 15A.

Preferred structural examples of various parts of the electromagnetic wave applying apparatus will be described below. The light source for supplying ultraviolet rays as an electromagnetic wave should preferably be a light source capable of emitting ultraviolet rays having wavelengths ranging from 170 to 380 nm, such as a low-pressure mercury lamp, a medium-pressure mercury lamp, a high-pressure mercury lamp, an excimer laser, a black light, or the like. Other electromagnetic wave sources than the ultraviolet lamp, such as those for emitting any visible light, infrared rays, X-rays, gamma rays, radio waves, or the like, may be employed. The protective tube used to prevent the ultraviolet lamp from being damaged and smeared should preferably be made of natural quartz glass or synthetic quartz glass. The protective tube may be of a double-walled tube structure having two quarts tubes of different diameters, with a liquid or a gas flowing therebetween for cooling the UV lamp.

The electromagnetic wave source 13 should preferably be installed vertically at the center of the inner wall surface of the cylinder 15 which is irradiated with ultraviolet rays. As described above, the inner wall surface of the cylinder may be slightly slanted. The electromagnetic wave source 13 thus arranged is capable of supplying a uniform amount of ultraviolet rays dose in all directions around.

Raw liquids to be irradiated with ultraviolet rays may be polluted water including leachate from final disposal sites, industrial drains, water for various uses, sewage, etc., liquids including potable water, purified water, drinking water, pure water, ultrapure water, etc., liquids containing organic substances or organisms such as bacteria, and liquids containing, together with organic substances, oxidizing agents including ozone, hydrogen peroxide, and sodium hypochlorite, heterogeneous catalysts such as titanium dioxide, and homogeneous catalysts such as iron ions. Substances in the liquid to be treated may be hardly biodegradable organic substances such as fumin acid, endocrine disruptors including dioxin, bisphenol-A, nonylphenol, diethylhexyldioxane phathalate, etc., organic chlorine compounds including carcinogen, trichloroethylene, chlorophenol, pesticides, TOX (Total Organic Halogen), etc. Furthermore, *escherichia coli*, general bacteria, and protozoa such as cryptospordium may also be substances in the liquid to be treated.

The inner wall of the cylinder 15 which is irradiated with electromagnetic waves may be made of synthetic resins such as vinyl chloride, metals such as stainless steel, glass, and ceramics. If the liquid is mainly composed of water, then the surface of the inner wall may be combined with a hydrophilic material such as titanium dioxide, for example, for forming a thin film of liquid more stably. If ultraviolet rays are applied to titanium dioxide, then active oxygen is generated from dissolved oxygen, making organic substances more degradable. The inner wall surface of the cylinder 15 which is irradiated with electromagnetic waves may be of an ordinary cylindrical shape for producing a thin-film liquid layer. For stably forming a thin-film liquid layer from a large amount of liquid, however, the inner wall surface of the cylinder should preferably have a bell-mouthed upper portion and be progressively larger in diameter upwardly in a curved configuration.

Treating conditions in the electromagnetic wave applying apparatus according to the present invention may be selected depending on the amount of the liquid, the diameter and length of the electromagnetic wave source such as an ultraviolet lamp, the diameter of the protective tube, the diameter of the inner wall, and the ultraviolet rays dose. For example, treating conditions for the use of ultraviolet rays, an ultraviolet lamp having a length of 1200 mm or less, and a protective tube having a diameter in the range from 30 to 40 mm will be described below.

The diameter of the cylinder which is irradiated with ultraviolet rays is selected normally in a range from 50 to 300 mm, or preferably in a range from 100 to 260 mm. The length of the portion of the cylinder which is irradiated with ultraviolet rays is longer than the ultraviolet lamp, and is selected normally in a range from 1 to 4 times the emission length of the ultraviolet lamp, or preferably in a range from 1.5 to 3 times the emission length of the ultraviolet lamp. The difference between the diameter of the inner circumferential surface of the outer wall of the liquid retention tank and the diameter of the outer circumferential surface of the inner wall of the liquid retention tank is selected normally in a range from 5 to 130 mm, or preferably in a range from 30 to 80 mm. If a low-pressure mercury lamp or a medium-pressure mercury lamp is used, then the ultraviolet dose is selected normally in a range from 0.005 to 5.0 w·hr/l, or preferably in a range from 0.01 to 3.0 w·hr/l. If a large ultraviolet dose is required, then the liquid may be repeatedly passed through the cylinder. The thickness of the thin-film liquid layer flowing down the inner wall surface of the cylinder is normally in a range from 1 to 5 mm, or preferably in a range from 2 to 4 mm. The overflow load imposed when the liquid flows from the liquid retention tank 16 onto the inner wall surface which is irradiated with ultraviolet rays is normally in a range from 100 to 600 m³/m·day, or preferably in a range from 200 to 500 m³/m·day. The speed of the swirling flow in the liquid retention tank 16 is normally in a range from 20 to 100 cm/second, or preferably in a range from 30 to 80 cm/second.

Specific examples of the present invention will be described below. However, the present invention is not limited to those specific examples.

EXAMPLE 1

Using the apparatus shown in FIGS. 1 and 2, a liquid having a COD (Chemical Oxygen Demand) of 50 mg/l, TOX of 1 mg/l, an iron concentration of 5 mg/l, a manganese concentration of 5 mg/l, and a dissolved $O_2$ concentration of 10 mg/l was treated with ultraviolet rays under the following conditions:

Ultraviolet lamp: medium-pressure mercury lamp (2 kW, the emission length of 350 mm)

Protective tube: outside diameter of 33 mm, made of ordinary quartz glass

Diameter of the inner wall surface of the cylinder: 200 mm

Bell-mouthed surface: defined by an arc which is one-quarter of a true circle having a diameter of d=30 mm Flow rate of the liquid: 200 l/minute Speed of the swirling flow: 80 cm/second Operating time: 24 hours As a result, the applied intensity of the ultraviolet rays after elapse of 24 hours was 98% of the initial level, and hence the applied intensity of the ultraviolet rays was substantially constant throughout the operating time of 24 hours. This indicates that the outer circumferential surface of the protective tube was not smeared by splashes of the liquid, etc. The COD and TOX of the treated water were 45 mg/l and 0.1 mg/l, respectively, on the average after elapse of 24 hours, and were reduced by 5 mg/l and 0.9 mg/l, respectively. These results show that a good effect was achieved by the application of the ultraviolet rays.

Figure 5:
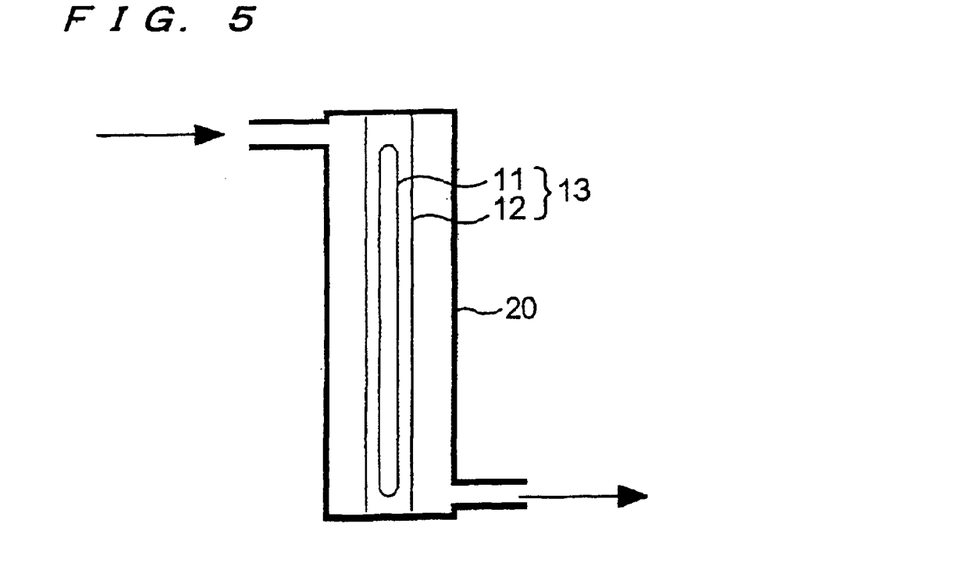
FIG. 5 is a vertical cross-sectional view of an ultraviolet applying apparatus according to a comparative example in which an ultraviolet source is immersed in a liquid.

In a comparative example, the same liquid was irradiated with ultraviolet rays using an apparatus shown in FIG. 5 under the conditions shown below. In the apparatus shown in FIG. 5, an electromagnetic wave source (ultraviolet source) 13 comprising an ultraviolet lamp 11 sealed in a watertight fashion by a protective tube 12 of quartz glass was immersed in a liquid to be treated within a cylindrical container 20.

Ultraviolet lamp: medium-pressure mercury lamp (2 kW, the emission length of 350 mm)

Protective tube: outside diameter of 33 mm, made of ordinary quartz glass

Diameter of the portion irradiated with ultraviolet rays: 200 mm

Flow rate of the liquid: 200 l/minute

Operating time: 24 hours

As a result, the applied intensity of the ultraviolet rays after elapse of 24 hours was 10% of the initial level, and hence the applied intensity of the ultraviolet rays had a tendency to drop greatly with time. This indicates that the surface of the protective tube was smeared by metal components or organic substances in the treated liquid, lowering the applied intensity of the ultraviolet rays. As a result, the reductions in the COD, TOX, etc. were lowered. The COD and TOX of the treated water were 49 mg/l and 0.8 mg/l, respectively, on the average after elapse of 24 hours, and were reduced by 1 mg/l and 0.2 mg/l, respectively, which were much smaller than those in above Example 1. These results show that the apparatus according to the present invention is capable of decomposing COD and TOX components while substantially fully preventing the protective tube from being contaminated.

EXAMPLE 2

Using the apparatus shown in FIGS. 1 and 2, a liquid having a hexachlorobenzene concentration of 10 μg/l, an iron concentration of 5 mg/l, and a manganese concentration of 5 mg/l was treated with ultraviolet rays under the same conditions as those of Example 1:

As a result, the applied intensity of the ultraviolet rays after elapse of 24 hours remained substantially unchanged, and hence was substantially constant throughout the 24 hours. The hexachlorobenzene concentration in the treated water was 8 μg/l on the average, and was reduced by 2 μg/l. Almost all decomposed products were chlorobenzene having a chlorine number of 5 or less. These results show that a dechlorinating reaction is possible according to the present invention.

EXAMPLE 3

Using the apparatus shown in FIGS. 1 and 2, a liquid having a COD (Chemical Oxygen Demand) of 50 mg/l, TOX of 1 mg/l, an iron concentration of 5 mg/l, a manganese concentration of 5 mg/l, and a dissolved $O_2$ concentration of 10 mg/l was treated with ultraviolet rays under the following conditions:

Ultraviolet lamp: medium-pressure mercury lamp (2 kW, the emission length of 350 mm)

Protective tube: outside diameter of 33 mm, made of ordinary quartz glass

Diameter of the inner wall surface irradiated with ultraviolet rays: 200 mm

Figure 6:
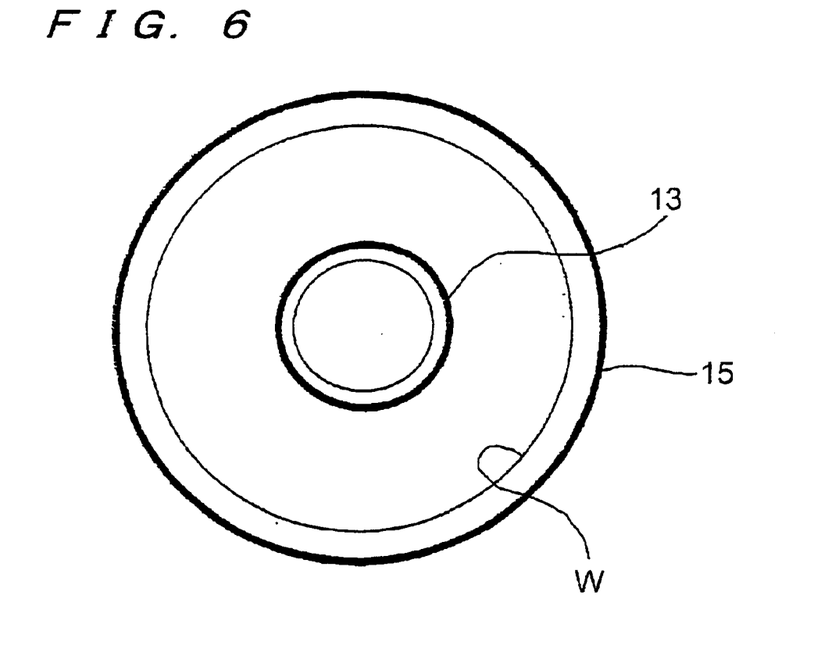
FIG. 6 is a plan view showing a uniform thin film of liquid formed on the inner wall surface of a cylinder.

Bell-mouthed surface: defined by an arc which is one-quarter of a true circle having a diameter of d=30 mm Flow rate of the liquid: 50 to 250 l/minute Operating time: 24 hours Speed of the swirling flow in the liquid retention tank: 20 to 100 cm/second As a result, the thin-film liquid layer on the inner wall surface of the cylinder was formed stably under the conditions of the flow rates up to 250 l/minute, and essentially no splashes were recognized. The thickness of the thin-film liquid layer W was uniform in any location thereon as shown in FIG. 6. The ratio of the ultraviolet rays that have passed through the protective tube after 24 hours was 98% or more of the initial level under any of the above conditions, and almost no reduction in the intensity of the ultraviolet rays was recognized.

Figure 7:
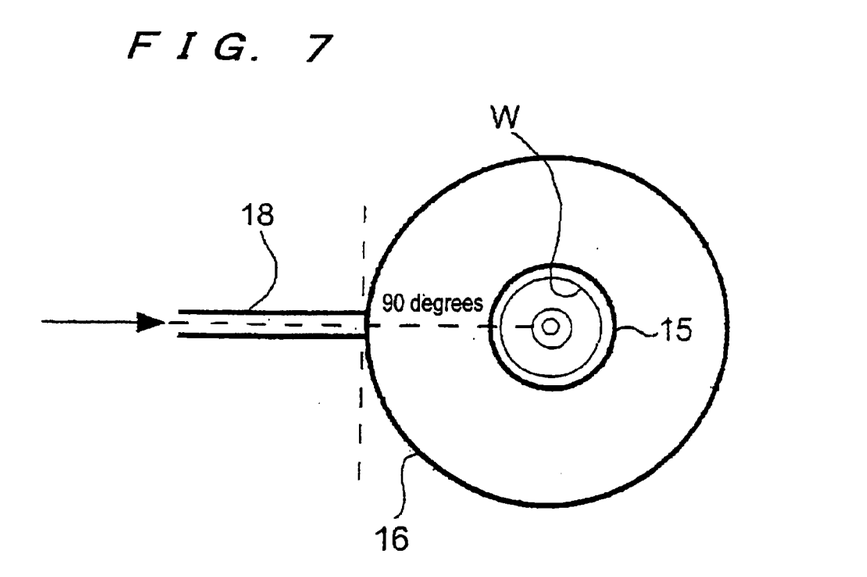
FIG. 7 is a plan view showing a liquid retention tank according to a comparative example in which an inflow tube is attached perpendicularly to a side wall of the liquid retention tank.
Figure 8:
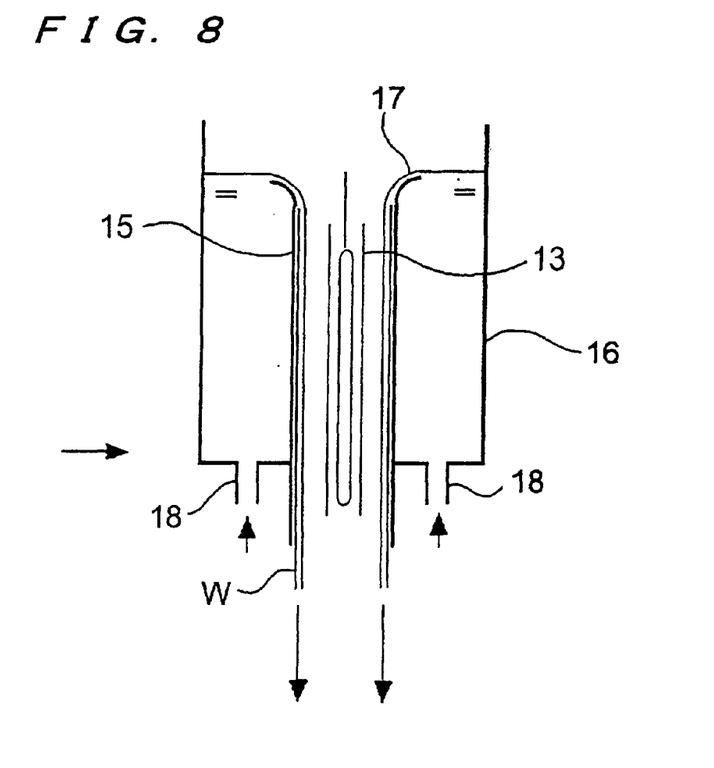
FIG. 8 is a vertical cross-sectional view showing a liquid retention tank according to a comparative example in which inflow tubes are attached perpendicularly to a bottom wall of the liquid retention tank.
Figure 9:
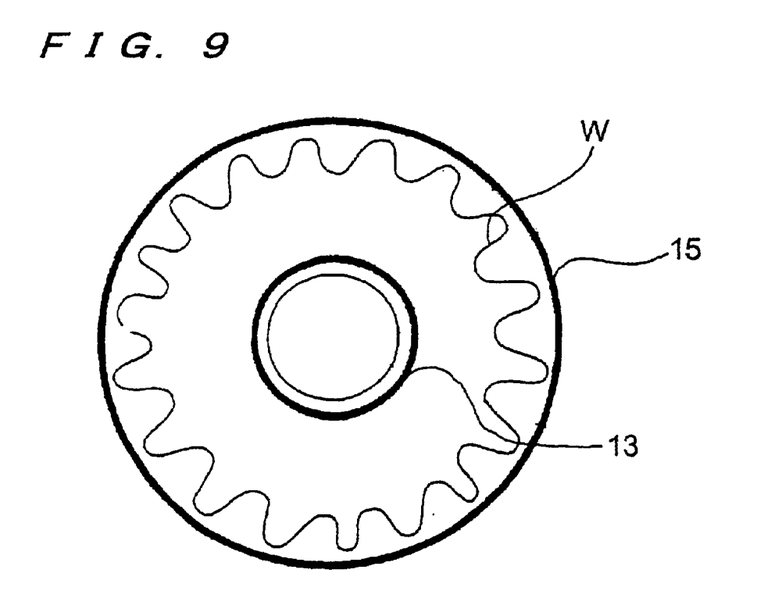
FIG. 9 is a plan view showing an irregular thin film of liquid formed on the inner wall surface of a cylinder.

In Comparative Example 1, an inflow tube 18 was attached perpendicularly to the outer circumferential surface of a liquid retention tank 16, as shown in FIG. 7. FIG. 8 shows inflow tubes 18 attached perpendicularly to a bottom wall of a liquid retention tank 16. In these ultraviolet applying apparatus, no swirling flow is developed in the liquid retention tank, and there is no swirling flow speed created on the inner wall surface of the cylinder 15. As a result, when these ultraviolet applying apparatus were used, the thin-film liquid layer W on the inner wall surface of the cylinder suffered thickness irregularities shown in FIG. 9 at liquid flow rates starting from 100 l/minute. The liquid produced splashes much more than if a swirling flow was formed. The ratio of the ultraviolet rays that have passed through the protective tube after 24 hours dropped to 50% of the initial level at liquid flow rates of 150 l/minute and higher.

A comparison based on whether a swirling flow is produced or not indicates that the stability of the thin-film liquid layer W, the uniformity of the thickness thereof, and the flow rate load were better when a swirling flow was produced.

Figure 10:
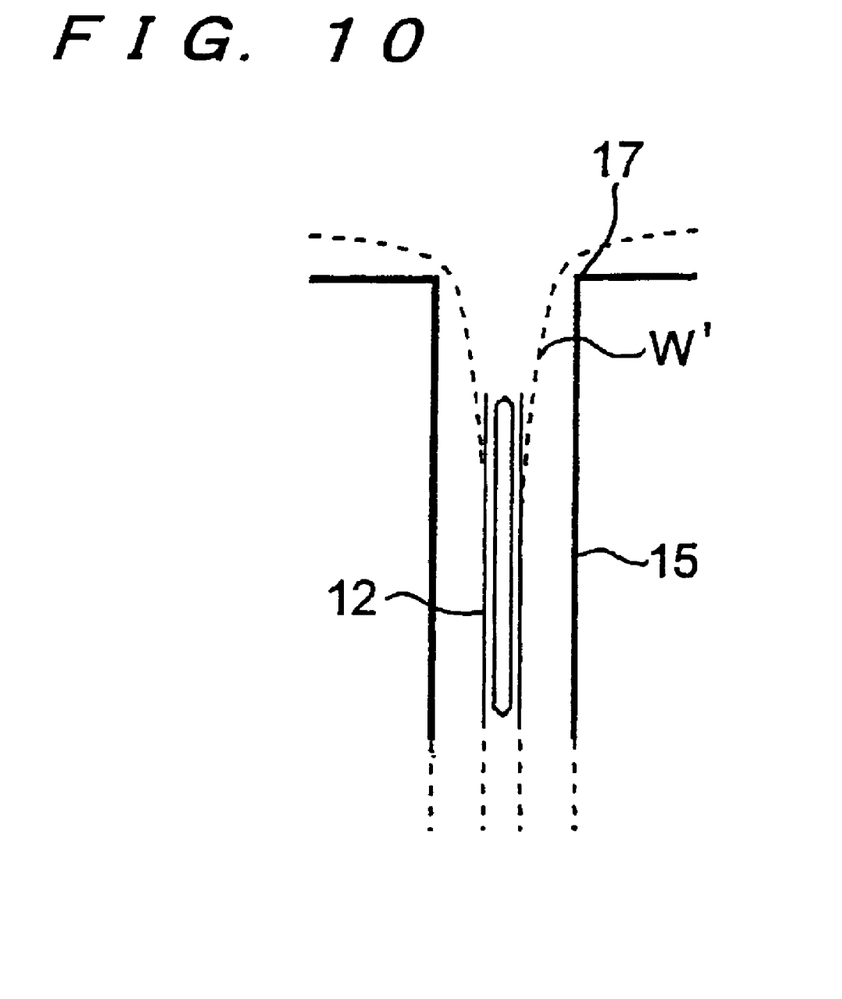
FIG. 10 is a vertical cross-sectional view of an ultraviolet applying apparatus according to a comparative example which has a right-angular inlet portion.

According to Comparative Example 2, a right-angular inlet portion 17 was employed as shown in FIG. 10 and there is no swirling flow developed. Other conditions were the same as those of Example 3.

At a flow rate of 100 l/minute, the thin film was irregular, and the liquid produced fine splashes, which were attached frequently to the protective tube 12. The ratio of the ultraviolet rays that have passed through the protective tube after 24 hours dropped to 40% of the initial level at a liquid flow rate of 100 l/minute.

When the liquid flow rate exceeded 100 l/minute, the thin film was peeled off the inner wall surface of the cylinder and ruptured, and was applied to the surface of the protective tube 12 disposed centrally in the cylinder, as indicated by the dotted lines W' in FIG. 10.

In each of the above embodiments, trace amounts of substances in the water were treated by the application of ultraviolet rays. However, lamps of other wavelengths may be used as the electromagnetic wave source for other applications. Thus, electromagnetic waves of various wavelengths may be used as the electromagnetic wave source.

The cylinder described above refers to an object capable of forming a thin-film liquid layer when the liquid flows down smoothly therealong. Therefore, the concept of the cylinder according to the present invention includes a polygonal prism, an oblate cylinder, or a similar shape which is effective to provide the above effect.

According to the present invention, as described above, a large amount of liquid can be treated by being stably irradiated with an electromagnetic wave. Specifically, the electromagnetic wave is applied from the electromagnetic wave source disposed in the protective tube to the liquid flowing as a thin film down the inner wall surface which is irradiated with the electromagnetic wave. (1) Because the inlet portion for introducing the liquid overflow from the liquid retention tank onto the inner wall surface of the cylinder has a curved surface, the state of the surface of the liquid is stabilized and/or uniformized, and the liquid overflow is supplied from all locations on the inlet portion smoothly at a constant speed. (2) Since a swirling flow speed is given to the liquid, even if the liquid contains suspended materials, they are prevented from being settled and/or accumulated in the liquid retention tank. Even when the liquid splashes while the liquid overflow flows down as a thin film from the upper end of the surface irradiated with ultraviolet rays, because the liquid is scattered tangentially to the inner wall surface of the cylinder, rather than centrally toward the protective tube, the protective tube is prevented from being contaminated by the liquid splashes. The thin film of the liquid on the inner wall surface which is irradiated with ultraviolet rays is subject to centrifugal forces because the liquid is swirling, so that the thin film is uniformly and stably formed, and its thickness is uniformized. (3) If the cylinder which is irradiated with ultraviolet rays has a slanted portion which is progressively larger in diameter upwardly, then the liquid is prevented from being peeled off the surface irradiated with ultraviolet rays while the liquid overflows is flowing down as a thin film therealong. Therefore, even when the liquid flows down in a large amount, the thin film of the liquid is stably formed.

INDUSTRIAL APPLICABILITY

The present invention is concerned with an apparatus for and a method of applying an electromagnetic wave such as ultraviolet rays or the like to various liquids including water being processed in wastewater treatment plants, industrial drains, water for various uses, sewage, purified water, drinking water, pure water, ultrapure water, etc. The invention is appropriately applicable to water treatments in various fields for decomposing trace amounts of contaminants by applying an electromagnetic wave such as ultraviolet rays or the like to various liquids in the above fields.

What is claimed is:

1. An electromagnetic wave applying apparatus comprising:
   a cylinder having an inner wall surface;
   an inlet portion disposed at a top end of said cylinder and having a curved surface, said inlet portion being connected to the top end of said cylinder so that the curved surface smoothly joins with the inner wall surface of said cylinder;
   a liquid retention tank disposed around said cylinder for storing a liquid and introducing the liquid over said inlet portion, said liquid retention tank including a swirling flow forming portion; and
   an electromagnetic wave source centrally disposed in said cylinder,
   wherein said cylinder is coaxially disposed around said electromagnetic wave source to permit a thin film liquid layer to flow over said inlet portion and down along the inner wall surface of said cylinder so that the thin film liquid layer can be irradiated with an electromagnetic wave emitted from said electromagnetic wave source, and
   wherein said swirling flow forming portion is operable to cause the liquid introduced from said inlet portion into said cylinder to flow as a swirling flow down the inner wall surface.

2. An electromagnetic wave applying apparatus according to claim 1, wherein said swirling flow forming portion forms a swirling flow in said liquid retention tank and liquid overflow from said liquid retention tank is introduced to said inlet portion at an upper end thereof.

3. An electromagnetic wave applying apparatus comprising:
   a cylinder having an inner wall surface;
   an inlet portion disposed at a top end of said cylinder and having a curved surface, said inlet portion being connected to the top end of said cylinder so that the curved surface smoothly joins with the inner wall surface of said cylinder;
   a liquid retention tank disposed around said cylinder for storing a liquid and introducing the liquid over said inlet portion, said retention tank comprising an inflow tube tangentially connected to a bottom portion of said liquid retention tank at an outer circumferential surface thereof so as to cause a swirling flow in said liquid retention tank; and
   an electromagnetic wave source centrally disposed in said cylinder,
   wherein said cylinder is coaxially disposed around said electromagnetic wave source to permit a thin film liquid layer to flow over said inlet portion and down along the inner wall surface of said cylinder so that the thin film liquid layer can be irradiated with an electromagnetic wave emitted from said electromagnetic wave source.

4. An electromagnetic wave applying apparatus according to claim 1, wherein said curved surface comprises an arc, which is one-quarter of a true circle.

5. An electromagnetic wave applying apparatus according to claim 1, wherein said curved surface comprises an arc, which is one-quarter of an oblong circle.

6. An electromagnetic wave applying apparatus according to claim 1, wherein said top portion and said cylinder are arranged so that the thin film liquid layer will form with uniform thickness without producing splashes and thickness irregularities.

7. An electromagnetic wave applying apparatus according to claim 1, wherein said inner wall surface of said cylinder is substantially vertical.

8. An electromagnetic wave applying apparatus according to claim 1, wherein said inner wall surface of said cylinder is slanted so that an upper diameter thereof is greater than a lower diameter thereof.

9. An electromagnetic wave applying apparatus according to claim 1, wherein said electromagnetic wave source is operable to emit ultraviolet rays.

10. An electromagnetic wave applying apparatus according to claim 1, wherein said electromagnetic wave source comprises an ultraviolet lamp and a protective tube.

11. A method of applying an electromagnetic wave to a liquid, the method comprising:

introducing a liquid into an upper end of a cylinder so that the liquid flows down along an inner wall surface of the cylinder as a swirling thin film; and applying an electromagnetic wave to the swirling thin film of liquid from an electromagnetic wave source disposed substantially centrally in the cylinder.

12. A method of applying an electromagnetic wave to a liquid according to claim 11, wherein the liquid is introduced to the cylinder along a curved surface disposed at an upper end of the cylinder.

13. A method of applying an electromagnetic wave to a liquid according to claim 11, wherein the inner wall surface of the cylinder is substantially vertical.

14. A method of applying an electromagnetic wave to a liquid according to claim 11, wherein the inner wall surface of said cylinder is slanted so that a diameter of the cylinder is greater at an upper portion thereof than at a lower portion thereof.

15. A method of applying an electromagnetic wave to a liquid according to claim 11, wherein the cylinder is coaxially disposed around the electromagnetic wave source.

16. A method of applying an electromagnetic wave to a liquid according to claim 11, wherein the electromagnetic wave applied to the swirling thin film of liquid comprises ultraviolet rays.

17. A method of applying an electromagnetic wave to a liquid according to claim 11, wherein said electromagnetic wave source comprises an ultraviolet lamp and a protective tube.

* * * * *

UNITED STATES PATENT AND TRADEMARK OFFICE
CERTIFICATE OF CORRECTION

PATENT NO. : 6,713,771 B2
DATED : March 30, 2004
INVENTOR(S) : Sota Nakagawa et al.

It is certified that error appears in the above-identified patent and that said Letters Patent is hereby corrected as shown below:

Title page,
Item [54], Title, change "METHOD AND APPARATUS FOR ELECTROMAGNETIC IRRADIATION OF LIQUID" to -- APPARATUS FOR AND METHOD OF APPLYING ELECTROMAGNETIC WAVE TO LIQUID --.

Signed and Sealed this

Fifteenth Day of February, 2005

JON W. DUDAS
*Director of the United States Patent and Trademark Office*